March 20, 1956 R. D. COOK ET AL 2,738,894
SWITCH BOX
Filed March 18, 1953

INVENTORS.
Raymond D. Cook
William Lang
BY
THEIR ATTORNEYS

United States Patent Office 2,738,894
Patented Mar. 20, 1956

2,738,894

SWITCH BOX

Raymond D. Cook and William A. Lang, Pittsburgh, Pa., assignors to Steel City Electric Company, Pittsburgh, Pa., a corporation of Pennsylvania Application March 18, 1953, Serial No. 343,192

1 Claim. (Cl. 220—3.3)

This invention relates to an easily installed, self-gauging switch box of simple construction adapted for use under varying conditions of installation and for various types of switches and which can be produced with a minimum of stamping dies and scrap loss.

My switch box includes only three principal parts which are stamped and joined together to form a housing open at one face. Gauging lines stamped in the box at predetermined distances from one end and gauging lugs provide proper positioning of the box during installation. Also, fastening means are permanently associated with the box so that the resulting assembly is a complete unit in itself ready for installation.

The accompanying drawing illustrates a presently preferred embodiment wherein.

Figure 2:
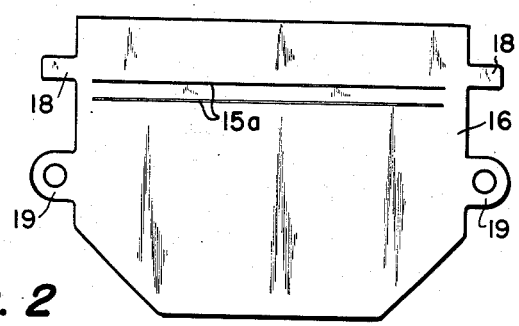
Figure 2 is an elevational view of one of the sides which join the strip of Figure 1 in forming the box.
Figure 1:
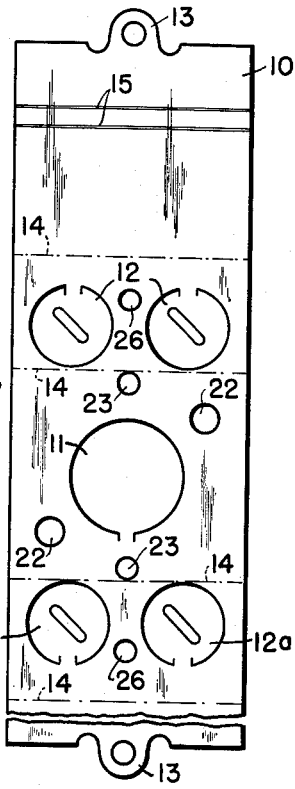
Figure 1 is a plan view of a center strip used in manufacturing the switch box.

Referring to the drawing, the switch box includes a center strip 10 which may be stamped from a relatively small piece of sheet metal with very little scrap loss. The knock-out portion 11, pull-out portions 12 and 12a, end lugs 13, bending lines 14, and gauge lines 15, as well as the remaining holes shown, may all be formed during the same stamping operation.

The sides 16 and 17 of the switch box are similarly stamped from small pieces with little loss. As shown in Figure 2, gauge lines 15a aligned with those of the strip 10, gauge lugs 18 in at least one of the sides, fastener lugs 19, and any openings desired may also be formed at this time.

In assembling the switch box, strip 10 is bent around the transverse bending lines 14 to form a wall of five faces. The lugs 13 are turned outwardly and subsequently receive the fasteners of a switch inserted in the box. The strip 10 is bent to conform with the sides 16 and 17 which are projection-welded to the strip as shown at 20 in Figure 3 to form a housing open at one face. The gauge lugs 18 on side 16 are bent back to be flush with the gauge line closest to the open face.

Figure 3:
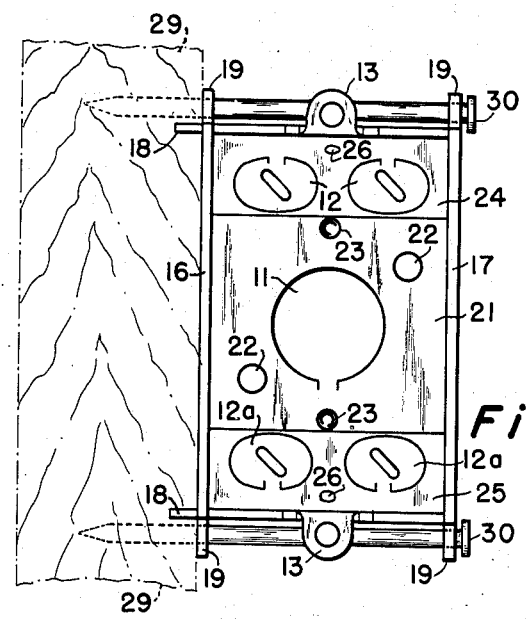
Figure 3 illustrates an installation of the completed switch box and represents a front view looking into the box.
Figure 4:
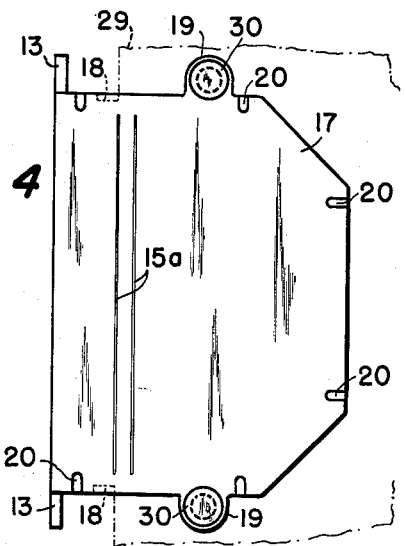
Figures 4 and 5 are a side elevation and plan view, respectively, of Figure 3.
Figure 5:
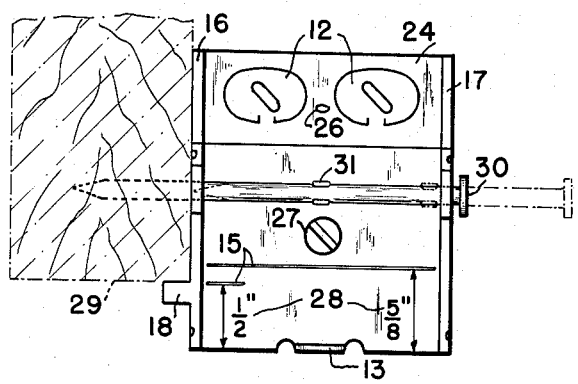

Referring now more particularly to the box when installed as illustrated in Figures 3 through 5, the center face 21 of the bent strip 10 contains the knock-out portion 11 and openings 22. If it is desired to introduce wires into the box through the knock-out portion, the latter is easily removed with a hammer and screwdriver, while openings 22 are for screws in the event the box is to be fixed to a support at its back. The openings 23 in the face 21 are threaded for screws which engage conventional wire clamps (not shown) for holding the wires in the box.

The faces 24 and 25 adjacent the center face have pull-out portions 12 and 12a, respectively, through which wires may be led into the box. A screw 27 is provided to ground the box.

An important feature of the present box lies in its self-gauging function. To this end, two gauge lines 15 and 15a are stamped on the sides and ends of the switch box so that when it is being installed, the operator need only align one of the gauge lines wtih studding depending on the plaster depth desired. Preferably, indicia 28 stamped on the box denote the distance of each line from the front or open face of the box. The box also has gauge lugs 18 in line with the gauge line of shortest distance from the face to speed installation. When the gauge line of shortest distance is to be used, all that is necessary is to place the box along a stud 29 as in Figure 5. The lugs 18 bear against the front of the stud and automatically place the switch box in the correct position for minimum plaster depth.

Another feature of the present switch box resides in the permanent association of the fastening means with the box so that the assembly is a complete unit in itself ready for installation. Lugs 19 on the sides 16 and 17 extend past each end face of the strip 10 adjacent the first transverse bending line and hold nails 30. A burr 31 pinched from the nail after its insertion through the lugs 19 keeps the nails in the lugs so that they are readily available when the box is nailed to studding or other support. During installation, the box is held against the studding with the gauge lugs 18 across the face of the studding and the nails 30 are driven into the stud as shown in Figure 5. If desired, the nails can be toed in by using just the lugs touching the stud.

It will now be apparent that the present switch box is simply and inexpensively constructed requiring few and simpler stamping dies and resulting in little scrap. At the same time, the box is rugged and quickly and easily installed with a minimum of time in a desired position by fasteners exterior of the box but carried by the box. Further, the switch box is self-gauging for plastering. It is important, also, that although the nails rigidly secure the box to the studding, they do not interfere with wiring inside the box.

While the foregoing disclosure describes a presently preferred embodiment, it is understood that the invention may be practiced in other forms within the scope of the appended claim.

I claim:

A switch box formed of sheet metal comprising a metallic strip bent along a plurality of transverse lines to form at least a three-sided wall, a side having a peripheral outline conforming to that of the three-sided wall and welded to each edge of said wall to form a housing having an open face adjacent the ends of the strip, each of said sides also having two integral lugs stamped out as part of the side and extending exteriorly of the housing past opposite edges of the strip, the lugs on one side being in line with the lugs on the other side when the sides are welded to the three-sided wall and having openings through which fasteners may be passed for securing the box to a support, and lugs integral with the side and bent from opposite edges of the side, said lugs being spaced inwardly from the open face of the box and lying in a plane at right angles to the side and to a support for the box whereby they may be brought up against the support to position the box relative to the support.

(References on following page)

References Cited in the file of this patent

UNITED STATES PATENTS

| | | |
|---|---|---|
| 982,193 | Thayer | Jan. 17, 1911 |
| 982,841 | Maison | Jan. 31, 1911 |
| 1,133,946 | Farrell | Mar. 30, 1915 |
| 1,454,722 | Boutin | May 8, 1923 |
| 1,718,878 | Raguette | June 25, 1929 |
| 1,725,293 | Morgenstern | Aug. 20, 1929 |
| 1,796,037 | Mangin | Mar. 10, 1931 |
| 2,214,968 | MacMillen | Sept. 17, 1940 |
| 2,639,054 | Austin | May 19, 1953 |